US009792193B2

(12) United States Patent
Xie et al.

(10) Patent No.: US 9,792,193 B2
(45) Date of Patent: Oct. 17, 2017

(54) METHOD AND SYSTEM FOR PROCESSING DATA CONFLICT

(71) Applicant: Huawei Technologies Co., Ltd., Shenzhen (CN)

(72) Inventors: Qian Xie, Shanghai (CN); Xinru Wang, Shanghai (CN); Guoxin Yang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 174 days.

(21) Appl. No.: 14/583,427

(22) Filed: Dec. 26, 2014

(65) Prior Publication Data

US 2015/0113192 A1 Apr. 23, 2015

Related U.S. Application Data

(63) Continuation of application No. PCT/CN2013/074347, filed on Apr. 18, 2013.

(30) Foreign Application Priority Data

Oct. 31, 2012 (CN) .......................... 2012 1 0428003

(51) Int. Cl.
*G06F 13/24* (2006.01)
*G06F 13/32* (2006.01)
(Continued)

(52) U.S. Cl.
CPC ............ *G06F 11/3027* (2013.01); *G06F 1/30* (2013.01); *G06F 13/24* (2013.01); *G06F 13/364* (2013.01);
(Continued)

(58) Field of Classification Search
CPC .... G06F 3/0619; G06F 11/08; G06F 11/1446; G06F 11/1448; G06F 17/30371; H04L 47/12; H04L 1/08
(Continued)

(56) References Cited

U.S. PATENT DOCUMENTS 5,657,327 A * 8/1997 Hamada ................ H04L 49/351
370/389
6,449,250 B1 * 9/2002 Otani ................... H04L 12/2801
370/219

(Continued)

FOREIGN PATENT DOCUMENTS

| CN | 101794320 A | 8/2010 |
| CN | 101825940 A | 9/2010 |
| CN | 101833364 A | 9/2010 |

OTHER PUBLICATIONS

Foreign Communication From a Counterpart Application, Chinese Application No. 201210428003.6, Chinese Office Action dated Mar. 22, 2016, 7 pages.

(Continued)

*Primary Examiner* — Faisal M Zaman
(74) *Attorney, Agent, or Firm* — Blakely, Sokoloff, Taylor & Zafman LLP (57) ABSTRACT

A method and a system for processing a data conflict are provided that relate to the field of signal interface technologies of an integrated circuit, where the method includes sending a power management bus (PMBus) command to a slave device by using a PMBus, so as to perform power management; when the PMBus command fails to be sent, determining whether the number of times that the PMBus command fails to be sent is greater than or equal to a preset value, where the preset value is configured in advance during system initialization; starting timing if the number of times that the PMBus command fails to be sent is less than (Continued)

the preset value; and resending the PMBus command when timing duration reaches resending time. The present invention is applicable to a scenario in which multiple master devices (Masters) send the PMBus command by using the PMBus.

18 Claims, 5 Drawing Sheets (51) Int. Cl.
G01R 31/08 (2006.01)
H04B 7/212 (2006.01)
G06F 11/30 (2006.01)
G06F 13/42 (2006.01)
G06F 1/30 (2006.01)
G06F 13/364 (2006.01)
G06F 1/32 (2006.01)

(52) U.S. Cl.
CPC .......... *G06F 13/4291* (2013.01); *G06F 1/324* (2013.01); *G06F 1/3296* (2013.01); *Y02B 60/1217* (2013.01)

(58) Field of Classification Search
USPC .......................... 370/216, 242, 337; 710/267
See application file for complete search history.

(56) References Cited

U.S. PATENT DOCUMENTS

| | | | | |
|---|---|---|---|---|
| 7,814,340 | B2* | 10/2010 | Heath | H04L 12/10 700/286 |
| 8,370,650 | B2* | 2/2013 | Paniagua, Jr. | G06F 1/26 320/114 |
| 2003/0070022 | A1* | 4/2003 | Ito | H04L 12/4135 710/240 |
| 2003/0198245 | A1* | 10/2003 | Bradford | H04L 12/4035 370/445 |
| 2005/0034035 | A1* | 2/2005 | Jung | G11B 20/1879 714/53 |
| 2005/0216812 | A1* | 9/2005 | Leon | H04L 1/1887 714/748 |
| 2005/0234914 | A1* | 10/2005 | Ishii | H04L 51/24 |
| 2005/0268142 | A1* | 12/2005 | Saripalli | G06F 13/4291 713/600 |
| 2006/0123181 | A1* | 6/2006 | Aull | H04L 47/10 710/310 |
| 2010/0322177 | A1* | 12/2010 | Luo | H04L 1/189 370/329 |
| 2010/0323725 | A1* | 12/2010 | Cai | H04W 4/12 455/466 |
| 2011/0080266 | A1 | 4/2011 | Rutman et al. | |
| 2011/0113171 | A1 | 5/2011 | Radhakrishnan et al. | |
| 2012/0054534 | A1* | 3/2012 | Tsao | H04L 1/1896 714/4.1 |
| 2013/0100895 | A1* | 4/2013 | Aghili | H04W 4/00 370/329 |
| 2013/0304999 | A1* | 11/2013 | Imai | G06F 13/4291 711/154 |

OTHER PUBLICATIONS

Partial English Translation and Abstract of Chinese Patent Application No. CN101794320A, Feb. 27, 2015, 4 pages.
Partial English Translation and Abstract of Chinese Patent Application No. CN101833364A, Mar. 3, 2015, 2 pages.
Foreign Communication From a Counterpart Application, PCT Application No. PCT/CN2013/074347, English Translation of International Search Report dated Aug. 8, 2013, 4 pages.
Foreign Communication From a Counterpart Application, PCT Application No. PCT/CN2013/074347, Written Opinion dated Aug. 8, 2013, 4 pages.

* cited by examiner

METHOD AND SYSTEM FOR PROCESSING DATA CONFLICT

CROSS-REFERENCE TO RELATED APPLICATIONS

This application is a continuation of International Application No. PCT/CN2013/074347, filed on Apr. 18, 2013, which claims priority to Chinese Patent Application No. 201210428003.6, filed on Oct. 31, 2012, both of which are hereby incorporated by reference in their entireties.

TECHNICAL FIELD

The present invention relates to the field of signal interface technologies of an integrated circuit, and in particular, to a method and a system for processing a data conflict.

BACKGROUND

With the rapid development of the semiconductor industry, people find that there are more requirements on the number of power supplies and power. Formerly, 3 to 4 power supplies may be enough for a system, and now there may be 10 to 20 or more power supplies. However, a time sequence for powering on and powering off the 10 to 20 or more power supplies is different, and power values are also different. Therefore, power management needs to be performed.

Power management bus (PMBus) is an open standard digital power management protocol, and may promote communication with a power converter or another device by defining transmission, a physical interface, and a command language. This protocol is established by a group of power supply and semiconductor manufacturers who think that the improvement of a solution of full digital power management is restrained due to a lack of a proper standard. At present, this protocol is being rapidly accepted by the industry.

As a management interface of a power supply chip, the PMBus is more widely used in a current integrated circuit system. A multi-output scenario in which multiple master devices (Masters) control a power supply chip in a same slave device is used as an example. The PMBus includes a data bus and a clock bus, and each Master is connected to the data bus and the clock bus. A PMBus command is sent to the power supply chip by using the data bus and the clock bus, and then the power supply chip is controlled, so that the power supply chip outputs corresponding voltage or implements another operation. A PMBus bus is an Inter-Integrated Circuit (I2C) serial bus; therefore, a data conflict may occur when multiple Masters are running at the same time. For example, two masters Master 0 and Master 1 are running at the same time. When detecting that the bus is idle, the two masters may send data to the power supply chip at the same time. At this moment, the PMBus initiates arbitration and determines which one between the Master 0 and the Master 1 is qualified to control the bus to perform data transmission, and data of a Master failed in the arbitration is discarded.

For the foregoing problem, an operation of the master failed in the arbitration may be discarded in the prior art, and the data is resent by using hardware; or an alarm is reported, then a command of resending the data is delivered by using software, and then the data is resent.

The prior art has at least the following problem. When a data conflict occurs in the multiple Masters, if the data is directly resent by using the hardware or the software, the resent data may still continuously conflict with each other, which may cause that a system cannot run normally, thereby seriously affecting reliability of the system.

SUMMARY

A method and a system for processing a data conflict are provided, which can solve a problem that a data conflict occurs on a PMBus in a scenario of multiple Masters, thereby improving system reliability.

According to a first aspect, a method for processing a data conflict is provided and includes sending a PMBus command to a slave device by using a PMBus, so as to perform power management; when the PMBus command fails to be sent, determining whether the number of times that the PMBus command fails to be sent is greater than or equal to a preset value, where the preset value is configured in advance during system initialization; starting timing if the number of times that the PMBus command fails to be sent is less than the preset value; and resending the PMBus command when timing duration reaches resending time.

In a first possible implementation manner, the resending time is greater than time required for sending a shortest PMBus command by a Master, and is less than or equal to the sum of time required for sending a longest PMBus command by all Masters in a system; instructing the slave device to report alarm information if the number of times that the PMBus command fails to be sent is greater than or equal to the preset value; interrupting, according to the alarm information acquired from the slave device, a process of sending the PMBus command to the slave device; and when the number of times that the PMBus command fails to be sent is less than the preset value, and before the starting timing, the method further includes sending a command of clearing the alarm information in the slave device to the slave device.

With reference to the first aspect or the first possible implementation manner of the first aspect, in a second possible implementation manner, the resending time is configured as fixed duration or random duration.

With reference to the first aspect or the second implementation manner of the first aspect, in a third possible implementation manner, the configuring the resending time as the fixed duration includes configuring resending time of the Master as the fixed duration before the sending a PMBus command to a slave device by using a PMBus, where the fixed duration configured for a different Master in the system is different.

Optionally, the configuring the resending time as the random duration includes, when the number of times that the PMBus command fails to be sent is less than the preset value, configuring, before the starting timing, the random duration for a Master that fails to send the PMBus command.

According to a second aspect, a system for processing a data conflict is provided, where the system includes a Master, a slave device, and a PMBus, where the Master accesses the slave device by using the PMBus, so as to perform power management; and the Master includes an adaptive voltage scaling (AVS) module, where the AVS module includes a command sending unit configured to send a PMBus command to the slave device by using the PMBus; a determining unit configured to, when the PMBus command fails to be sent, determine whether the number of times that the PMBus command fails to be sent is greater than or equal to a preset value, where the preset value is configured in advance during system initialization; and a timing unit configured to start timing when the number of times that the PMBus command fails to be sent is less than the preset value; and the command sending unit is further configured to resend the PMBus command when timing duration of the timing unit reaches resending time.

In a first possible implementation manner, the resending time is greater than time required for sending a shortest PMBus command by the Master, and is less than or equal to the sum of time required for sending a longest PMBus command by all Masters in the system.

Further, the AVS module further includes an alarm reporting unit; where the alarm reporting unit is configured to instruct the slave device to report alarm information when the number of times that the PMBus command fails to be sent is greater than or equal to the preset value; and the Master further includes a processing module, where the processing module is configured to interrupt, according to the alarm information acquired from the slave device, a process of sending the PMBus command to the slave device.

Further, the command sending unit is further configured to send a command of clearing the alarm information in the slave device to the slave device.

With reference to the second aspect or the first possible implementation manner of the second aspect, in a second possible implementation manner, the AVS module further includes a time configuring unit configured to configure the resending time as fixed duration or random duration.

With reference to the second aspect or the second possible implementation manner of the second aspect, in a third possible implementation manner, the time configuring unit includes a first time configuring subunit configured to configure resending time of the Master as the fixed duration before the sending a PMBus command to the slave device by using the PMBus, where the fixed duration configured for a different Master in the system is different.

Optionally, the time configuring unit further includes a second time configuring subunit configured to, when the number of times that the PMBus command fails to be sent is less than the preset value, configure, before the starting timing, the random duration for a Master that fails to send the PMBus command.

Compared with the prior art, in the embodiments of the present invention, a PMBus command is sent to a slave device by using a PMBus; when the PMBus command fails to be sent, it is determined whether the number of times that the PMBus command fails to be sent is greater than or equal to a preset value, where the preset value is configured in advance during system initialization; when the number of times that the PMBus command fails to be sent is greater than or equal to the preset value, a process is ended according to alarm information acquired from the slave device; timing is started when the number of times that the PMBus command fails to be sent is less than the preset value; and the PMBus command is resent when timing duration reaches resending time. In the foregoing process, buffer time, with certain duration, for resending the PMBus command is configured for Masters encountering a data conflict in a system, thereby reducing a probability that multiple Masters already encountering a data conflict encounter a same data conflict again when resending the PMBus command, which greatly improves system reliability and ensures normal running of the system.

BRIEF DESCRIPTION OF THE DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

To make the advantages of the technical solutions of the present invention clearer, the following describes the present invention in detail with reference to the accompanying drawings and embodiments.

Embodiment 1

Figure 1:
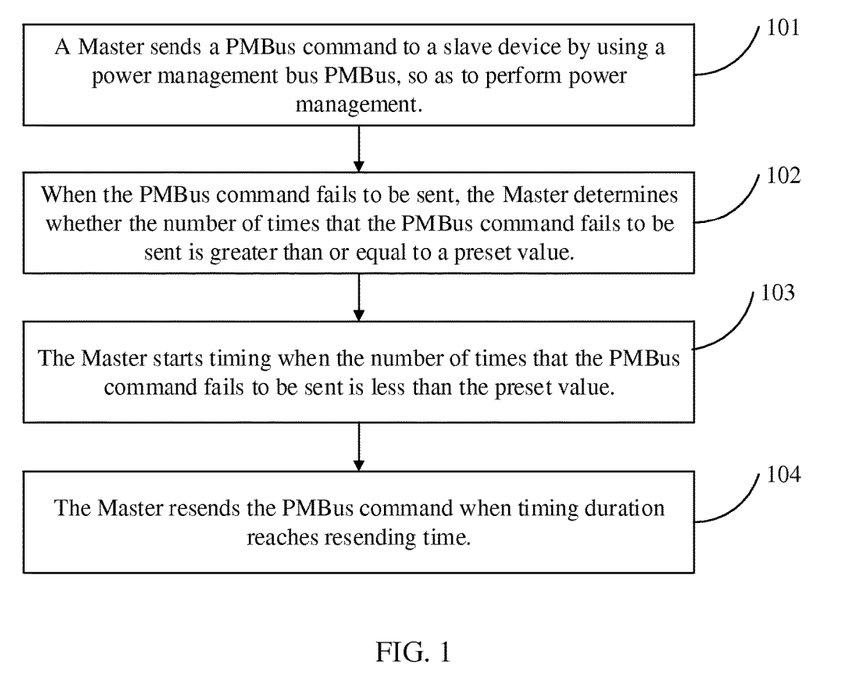
FIG. 1 is a flowchart of a method according to Embodiment 1 of the present invention.

This embodiment provides a method for processing a data conflict. As shown in FIG. 1, the method includes the following steps.

101. A Master sends a PMBus command to a slave device by using a PMBus, so as to perform power management.

It should be noted that the PMBus is a specified digital communications protocol for controlling power conversion and managing a component. In power management, the PMBus is used as a management interface of a power supply chip of the slave device. The Master may configure, monitor, and operate a power converter of the slave device according to a standard command set. Specifically, by using the PMBus command, the Master may configure a working parameter of a power supply, monitor work of the power supply, perform correct measurement according to a failure and an alarm, and so on. The PMBus command may be a configuration command or a control command. For example, the configuration command may specifically include a voltage scaling command for configuring a set value of output voltage, a working frequency configuration command, a phase delay configuration command, and so on; and the control command may specifically include a command for controlling the slave device to perform enabling/disconnecting, a command for making the slave device output voltage, a command for controlling and adjusting a working frequency and a tolerance of the slave device, and so on.

Further, the slave device may configure a corresponding parameter or adjust a working state according to a specific command after receiving the PMBus command.

102. When the PMBus command fails to be sent, the Master determines whether the number of times that the PMBus command fails to be sent is greater than or equal to a preset value.

The preset value is configured in advance during system initialization.

It should be noted that, when a system has multiple Masters that control the slave device by using the PMBus, if two or more Masters send a voltage scaling command or another control command to the slave device at the same time by using an I2C bus, the I2C bus may perform arbitration on these Masters. Only one Master is allowed to control the bus, and data of other Masters not allowed to control the bus is discarded; as a result, the command fails to be sent, and the command needs to be resent.

103. The Master starts timing when the number of times that the PMBus command fails to be sent is less than the preset value.

104. The Master resends the PMBus command when timing duration reaches resending time.

The resending time is greater than time required for sending a shortest PMBus command by the Master, and is less than or equal to the sum of time required for sending a longest PMBus command by all Masters in the system.

Further, the slave device is instructed to report alarm information if the number of times that the PMBus command fails to be sent is greater than or equal to the preset value; and a process of sending the PMBus command to the slave device is interrupted according to the alarm information acquired from the slave device.

Further, the resending time is configured as fixed duration or random duration.

Optionally, the configuring the resending time as the fixed duration includes configuring resending time of the Master as the fixed duration before the sending a PMBus command to a slave device by using a PMBus, where the fixed duration configured for a different Master in the system is different.

Optionally, the configuring the resending time as the random duration includes, when the number of times that the PMBus command fails to be sent is less than the preset value, configuring, before the starting timing, the random duration for a Master that fails to send the PMBus command.

Optionally, when the number of times that the PMBus command fails to be sent is less than the preset value, and before the starting timing, the method further include sending a command of clearing the alarm information in the slave device to the slave device.

Compared with the prior art, in this embodiment of the present invention, a PMBus command is sent to a slave device by using a PMBus; when the PMBus command fails to be sent, it is determined whether the number of times that the PMBus command fails to be sent is greater than or equal to a preset value, where the preset value is configured in advance during system initialization; when the number of times that the PMBus command fails to be sent is greater than or equal to the preset value, a process is ended according to alarm information acquired from the slave device; timing is started when the number of times that the PMBus command fails to be sent is less than the preset value; and the PMBus command is resent when timing duration reaches resending time. In the foregoing process, buffer time, with certain duration, for resending the PMBus command is configured for Masters encountering a data conflict in a system, thereby reducing a probability that multiple Masters already encountering a data conflict encounter a same data conflict again when resending the PMBus command, which greatly improves system reliability and ensures normal running of the system.

Embodiment 2

Figure 2:
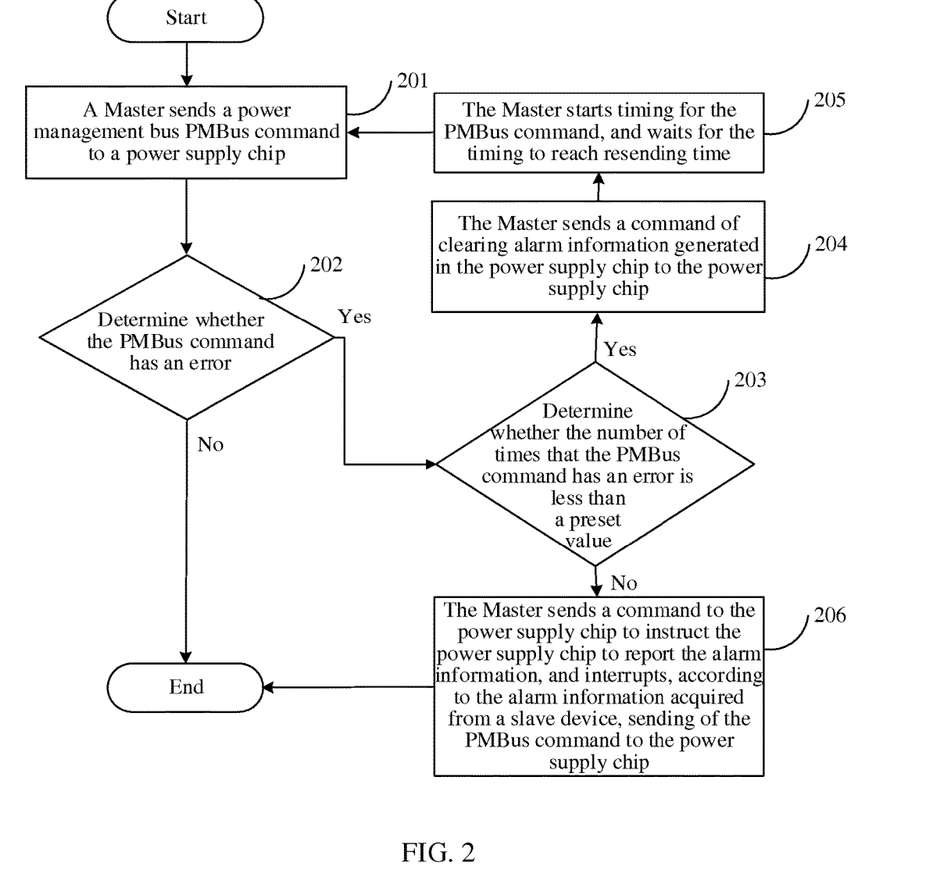
FIG. 2 is a flowchart of a method according to Embodiment 2 of the present invention.

This embodiment provides a method for processing a data conflict. For a slave device, a power supply chip is used as an example. As shown in FIG. 2, the method includes the following steps.

201. A Master sends a PMBus command to a power supply chip.

For example, the PMBus command may be a voltage scaling command or another control command; and the power supply chip is a slave device. The Master sends the PMBus command to the power supply chip by using a data bus (which may be referred to as pmbus_data) and a clock bus (which may be referred to as pmbus_clk); and after receiving the voltage scaling command, the power supply chip may correspondingly adjust voltage that is output to the Master, or perform a corresponding operation such as a power-on operation according to the another control command.

Optionally, in a general case, a system has multiple Masters that control the power supply chip, and when two or more Masters send a command to the power supply chip at the same time, the PMBus bus may perform, according to a mechanism, arbitration on the Masters that send the command at the same time, to determine which one among the Masters has a highest priority. A Master with a higher priority is allowed to control the bus to send the PMBus command; and a Master with a lower priority may fail to send the command; therefore, the Master needs to execute step 202 to perform determining, so as to determine a next process to be performed.

202. Determine whether the PMBus command has an error. If the PMBus command has an error, step 203 is performed; and if the PMBus command has no error, the process is ended after the PMBus command is sent.

The Master obtains a response from the power supply chip each time when sending data of one byte to the power supply chip. When the power supply chip cannot respond to the Master, the data bus is kept at a low level, so as to enable the Master to learn that there is an error in sending of the data, and then step 203 is performed.

Optionally, the process may be directly ended after the PMBus command is successfully sent.

203. Determine whether the number of times that the PMBus command has an error is less than a preset value configured by the system. If the number of times that the PMBus command has an error is less than the preset value configured by the system, step 204 is performed; and if the number of times that the PMBus command has an error is greater than or equal to the preset value configured by the system, step 206 is performed.

204. The Master sends a command of clearing alarm information generated in the power supply chip to the power supply chip.

Optionally, when the number of times that the PMBus command has an error sent by the Master is less than the preset value, an error at this moment may be caused by some problems that can be solved, and the error does not need to be reported to a central processing unit (CPU) for processing; however, the power supply chip at this moment still generates alarm information about the error. The alarm information becomes junk information due to improvement of a processing process of the present invention; therefore, the power supply chip needs to be notified that the alarm information needs to be cleared to release memory.

205. The Master starts timing for the PMBus command, waits for the timing to reach resending time, and then performs step 201 again.

For example, when a data conflict is caused by that multiple Masters send the PMBus command at the same time, and the PMBus command needs to be resent, in order to prevent the data conflict from being caused again when these Masters resend the PMBus command, different resending wait time, that is, resending time, is configured for the Masters, so that these Masters stagger time of sending the PMBus command, thereby avoiding the data conflict.

Further, to enable the resending time to effectively stagger the time of sending the command by the Masters, a lower limit min_length of duration is defined for the resending time, where the min_length is duration required for sending a shortest PMBus command by the Master in the system.

It should be noted that there is a case for the defined min_length. It is assumed that there are two Masters Master 0 and Master 1; the Master 0 is sending the PMBus command, and the Master 1 intends to resend the PMBus command by using resending time with duration slightly greater than the min_length. Time required for sending the PMBus command by the Master 0 is much greater than the min_length, and at this moment, the Master 1 starts timing for resending the PMBus command of the Master 1 at the same time when the Master 0 starts to send the PMBus command, and after the timing of the Master 1 reaches the min_length, the Master 1 resends the PMBus command; however, the Master 0 has not finished sending the PMBus command of the Master 0, the data conflict occurs in the two Masters. This case cannot be avoided due to a limitation of a setting principle of the min_length; however, when the Master 1 performs a second resending, the foregoing problem does not occur again; therefore, it is completely feasible to define the resending time as the min_length. In addition, in order to consider efficiency of the bus of the system, the resending time cannot be defined to be excessively long, and must be less than or equal to an upper limit max_length, where the max_length is the sum of duration required for sending a longest PMBus command by all Masters in the system.

Optionally, the resending time may be configured for each Master. For example, a different fixed resending time is configured for each Master in the system before step 201 is performed, so as to ensure that the data conflict does not occur again when two or more Masters perform resending; alternatively, before timing is started in step 205, the resending time is instantly configured for a Master that needs to resend the PMBus command, where the time configured at this moment may be a different random value between the min_length and the max_length, so as to ensure normal resending.

206. The Master sends a command to the power supply chip to instruct the power supply chip to report the alarm information, and interrupts, according to the alarm information acquired from the slave device, sending of the PMBus command to the power supply chip.

Figure 3:
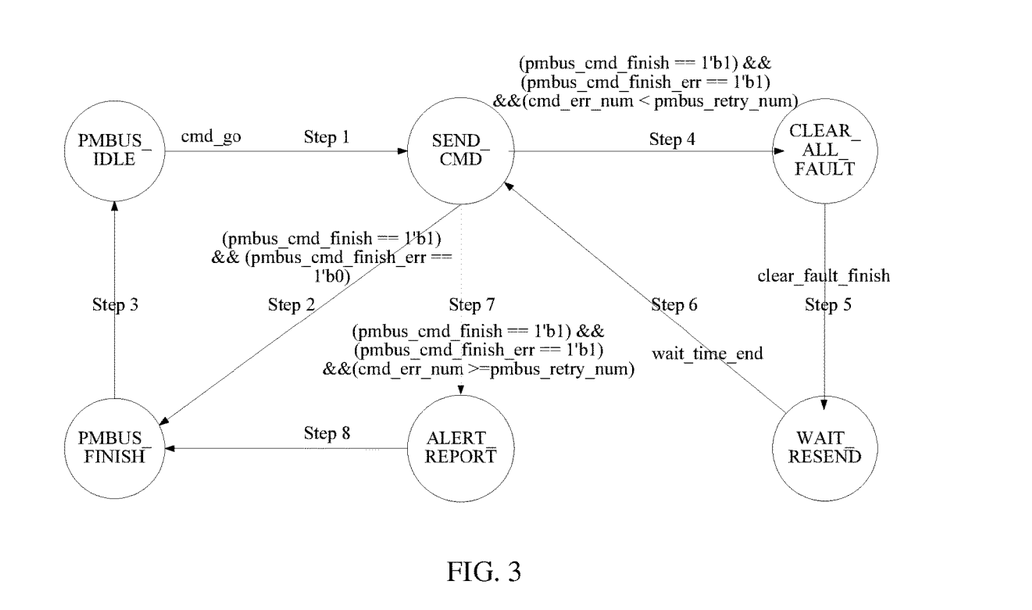
FIG. 3 is a flowchart for implementing a state machine according to Embodiment 2 of the present invention.

Further, a state machine implementation procedure of a process of this embodiment of the present invention is shown in FIG. 3. If no error occurs in the PMBus command sent by the Master, step 1, step 2, and step 3 in FIG. 3 are performed; if an error occurs in the PMBus command sent by the Master, and the number of resending times is less than a preset value, step 1, step 4, step 5, and step 6 in FIG. 3 are performed; if resending is successful, step 2 and step 3 in FIG. 3 are performed, and then the process is ended; and if resending is not successful, step 4, step 5, and step 6 in FIG. 3 are circularly performed until a maximum number of error times is reached, and step 7, step 8, and step 3 are performed, and then the process is ended.

It should be noted that the Master in this embodiment of the present invention may be an application-specific integrated circuit (ASIC), a board-level CPU, or the like; and the slave device may be a power supply chip, or the like. However, no limitation is constituted on a specific form of a device.

Compared with the prior art, in this embodiment of the present invention, a PMBus command is sent to a slave device by using a PMBus; when the PMBus command fails to be sent, it is determined whether the number of times that the PMBus command fails to be sent is greater than or equal to a preset value, where the preset value is configured in advance during system initialization; when the number of times that the PMBus command fails to be sent is greater than or equal to the preset value, a process is ended according to alarm information acquired from the slave device; timing is started when the number of times that the PMBus command fails to be sent is less than the preset value; and the PMBus command is resent when timing duration reaches resending time. In the foregoing process, buffer time, with certain duration, for resending the PMBus command is configured for Masters encountering a data conflict in a system, thereby reducing a probability that multiple Masters already encountering a data conflict encounter a same data conflict again when resending the PMBus command, which greatly improves system reliability and ensures normal running of the system.

Embodiment 3

Figure 4:
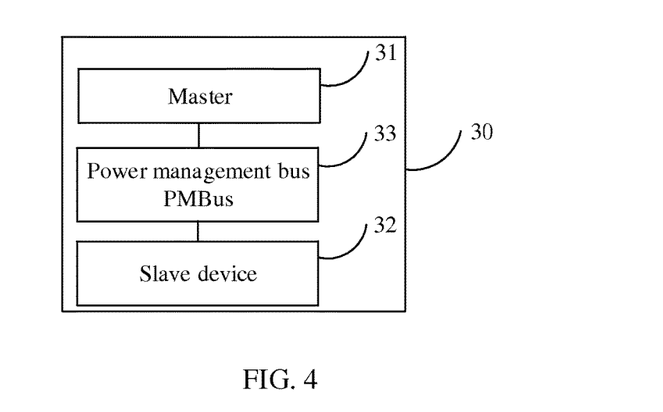
FIG. 4 and FIG. 5 are schematic structural diagrams of a system according to Embodiment 3 of the present invention.

This embodiment provides a system 30 for processing a data conflict. As shown in FIG. 4, the system 30 includes a Master 31, a slave device 32, and a PMBus 33, where the Master 31 accesses the slave device 32 by using the PMBus 33, so as to perform power management.

Figure 5:
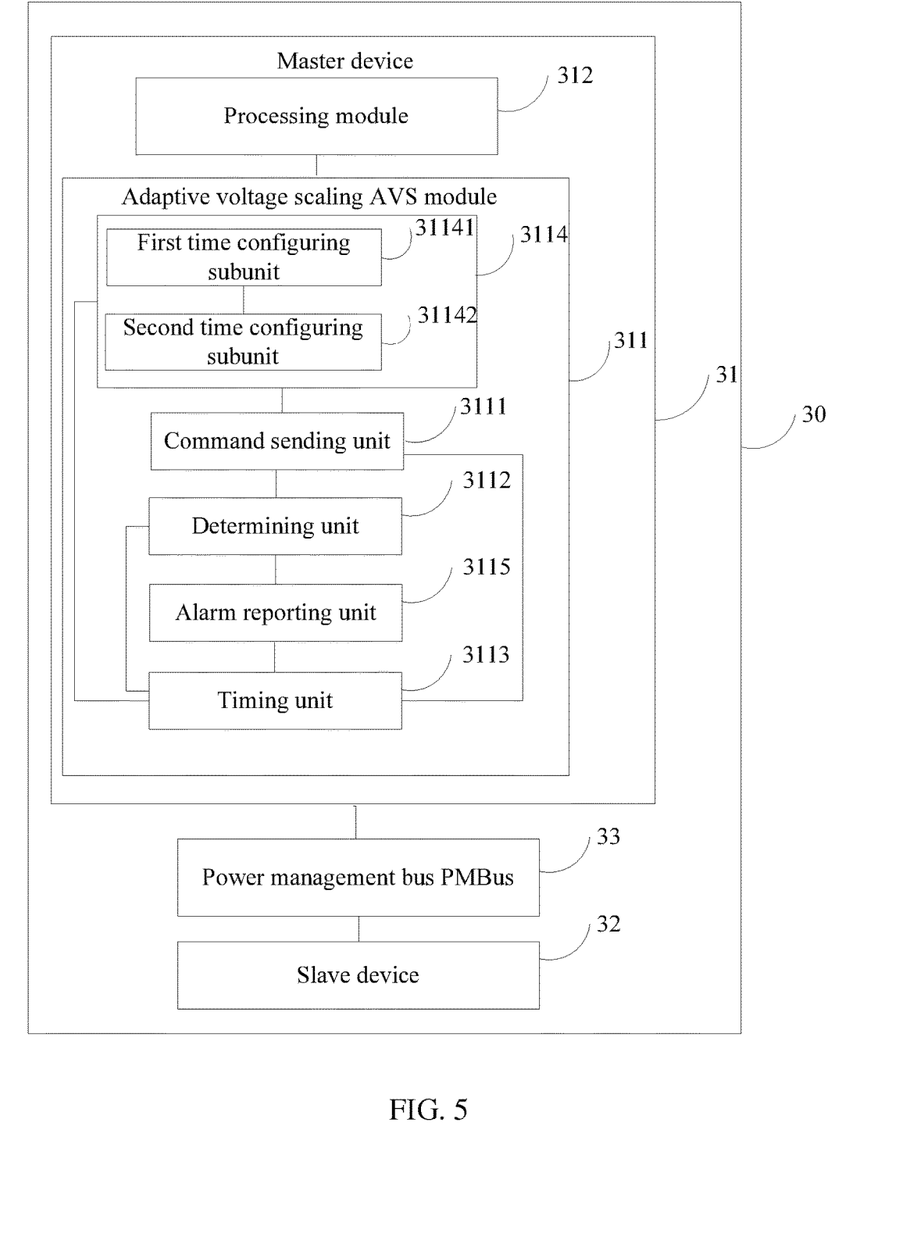

Further, as shown in FIG. 5, the Master 31 includes an AVS (Adaptive Voltage Scaling, adaptive voltage scaling) module 311, where the AVS module 311 includes a command sending unit 3111 configured to send a PMBus command to the slave device 32 by using the PMBus 33; a determining unit 3112 configured to, when the PMBus command fails to be sent, determine whether the number of times that the PMBus command fails to be sent is greater than or equal to a preset value, where the preset value is configured in advance during system initialization; and a timing unit 3113 configured to start timing when the number of times that the PMBus command fails to be sent is less than the preset value; and the command sending unit 3111 is further configured to resend the PMBus command when timing duration of the timing unit 3113 reaches resending time.

The resending time is greater than time required for sending a shortest PMBus command by a Master, and is less than or equal to the sum of time required for sending a longest PMBus command by all Masters in the system.

Further, as shown in FIG. 5, the AVS module 311 may further include a time configuring unit 3114 configured to configure the resending time as fixed duration or random duration.

Further, as shown in FIG. 5, the time configuring unit 3114 may further include a first time configuring subunit 31141 configured to configure resending time of the Master as the fixed duration before the sending a PMBus command to the slave device 32 by using the PMBus 33, where the fixed duration configured for a different Master in the system is different; and a second time configuring subunit 31142 configured to, when the number of times that the PMBus command fails to be sent is less than the preset value, configure, before the starting timing, the random duration for a Master that fails to send the PMBus command.

Further, as shown in FIG. 5, the AVS module 311 may further include an alarm reporting unit 3115; where the alarm reporting unit 3115 is configured to instruct the slave device 32 to report alarm information when the number of times that the PMBus command fails to be sent is greater than or equal to the preset value; and the Master 31 further includes a processing module 312; where the processing module 312 is configured to interrupt, according to the alarm information acquired from the slave device 32, a process of sending the PMBus command to the slave device 32.

Further, the command sending unit 3111 is further configured to send a command of clearing the alarm information in the slave device 32 to the slave device 32.

It should be noted that the Master in this embodiment of the present invention may be an ASIC, a board-level CPU, or the like; and the slave device may be a power supply chip, or the like. However, no limitation is constituted on a specific form of a device.

Compared with the prior art, in this embodiment of the present invention, a PMBus command is sent to a slave device by using a PMBus; when the PMBus command fails to be sent, it is determined whether the number of times that the PMBus command fails to be sent is greater than or equal to a preset value, where the preset value is configured in advance during system initialization; when the number of times that the PMBus command fails to be sent is greater than or equal to the preset value, a process is ended according to alarm information acquired from the slave device; timing is started when the number of times that the PMBus command fails to be sent is less than the preset value; and the PMBus command is resent when timing duration reaches resending time. In the foregoing process, buffer time, with certain duration, for resending the PMBus command is configured for Masters encountering a data conflict in a system, thereby reducing a probability that multiple Masters already encountering a data conflict encounter a same data conflict again when resending the PMBus command, which greatly improves system reliability and ensures normal running of the system.

Embodiment 4

Figure 6:
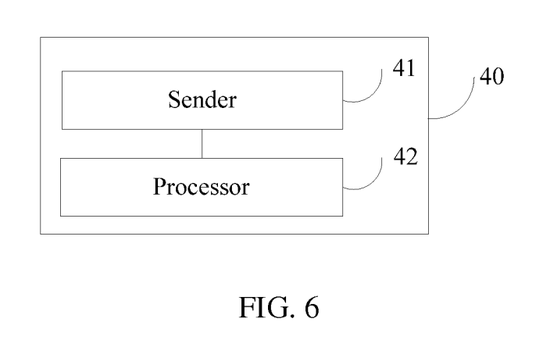
FIG. 6 is a schematic structural diagram of an apparatus according to Embodiment 4 of the present invention.

This embodiment provides an apparatus 40 for processing a data conflict. As shown in FIG. 6, the apparatus 40 includes a sender 41 configured to send a PMBus command to a slave device by using a PMBus, and resend the PMBus command when timing duration of a processor 42 reaches resending time; and the processor 42 configured to, when the PMBus command fails to be sent, determine whether the number of times that the PMBus command fails to be sent is greater than or equal to a preset value, where the preset value is configured in advance during system initialization, and start timing when the number of times that the PMBus command fails to be sent is less than the preset value.

The resending time is greater than time required for sending a shortest PMBus command by a Master, and is less than or equal to the sum of time required for sending a longest PMBus command by all Masters in a system.

Further, the processor 42 is further configured to instruct the slave device to report alarm information when the number of times that the PMBus command fails to be sent is greater than or equal to the preset value, and interrupt, according to the alarm information acquired from the slave device, a process of sending the PMBus command to the slave device.

Further, the processor 42 is further configured to configure the resending time as fixed duration or random duration.

Further, the processor 42 is further configured to configure resending time of the Master as the fixed duration before the sending the PMBus command to the slave device by using the PMBus, where the fixed duration configured for a different Master in the system is different; or when the number of times that the PMBus command fails to be sent is less than the preset value, configure, before the starting timing, the random duration for a Master that fails to send the PMBus command.

Further, the sender 41 is further configured to send a command of clearing the alarm information in the slave device to the slave device.

Compared with the prior art, in this embodiment of the present invention, a PMBus command is sent to a slave device by using a PMBus; when the PMBus command fails to be sent, it is determined whether the number of times that the PMBus command fails to be sent is greater than or equal to a preset value, where the preset value is configured in advance during system initialization; when the number of times that the PMBus command fails to be sent is greater than or equal to the preset value, a process is ended according to alarm information acquired from the slave device; timing is started when the number of times that the PMBus command fails to be sent is less than the preset value; and the PMBus command is resent when timing duration reaches resending time. In the foregoing process, buffer time, with certain duration, for resending the PMBus command is configured for Masters encountering a data conflict in a system, thereby reducing a probability that multiple Masters already encountering a data conflict encounter a same data conflict again when resending the PMBus command, which greatly improves system reliability and ensures normal running of the system.

The system for processing a data conflict according to this embodiment of the present invention may implement the foregoing method embodiments; for specific function implementation, reference may be made to descriptions of the method embodiments, and details are not repeatedly described herein. The method and the system for processing a data conflict according to the embodiments of the present invention may be applicable to a scenario in which multiple Masters send a PMBus command by using a PMBus, to which it is not limited.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The storage medium may include a magnetic disk, an optical disc, a read-only memory (ROM), or a random access memory (RAM).

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for processing a data conflict, comprising:
sending by a first master device a power management bus (PMBus) command to a slave device over a PMBus to perform power management, wherein the first master device is one of a plurality of master devices that are coupled to the slave device over the PMBus, and wherein the PMBus arbitrates amongst the master devices to allow only one of the master devices sending a PMBus command to the slave device at a time;
detecting by the first master device that the PMBus command has failed to be sent to the slave device over the PMBus, including determining that an ownership of the PMBus has been granted by the PMBus to a second master device of the plurality of master devices at a point in time;
in response to the detection, determining by the first master device whether a number of times that the PMBus command fails to be sent is greater than or equal to a preset value, wherein the preset value is configured in advance during system initialization;
starting by the first master device timing when the number of times that the PMBus command fails to be sent is less than the preset value; and
resending by the first master device the PMBus command when timing duration reaches resending time, wherein the resending time is specifically associated with the first master device, wherein the resending time is greater than time required for sending a shortest PMBus command by any of the master devices, and wherein the resending time is less than or equal to a sum of time required for sending a longest PMBus command by all of the master devices in a system.

2. The method according to claim 1, wherein the resending time is configured as a fixed duration, wherein each of the plurality of master devices is preconfigured with a fixed duration that is different from a remainder of the master devices, such that a possibility of subsequent data conflict can be reduced.

3. The method according to claim 1, wherein the resending time is configured as a random duration dynamically by the first master device prior to starting the timing, in response to detecting that the PMBus command has failed.

4. The method according to claim 2, wherein configuring the resending time as the fixed duration comprises configuring the resending time of the first master device as the fixed duration before sending the PMBus command to the slave device over the PMBus, wherein the fixed duration configured for a different master device in the system is different.

5. The method according to claim 3, wherein configuring the resending time as the random duration comprises configuring, before the starting timing, the random duration for a master device that fails to send the PMBus command when the number of times that the PMBus command fails to be sent is less than the preset value.

6. The method according to claim 1, further comprising:
instructing by the first master device the slave device to report alarm information when the number of times that the PMBus command fails to be sent is greater than or equal to the preset value, wherein the slave device is instructed to report the alarm information prior to sending the PMBus command by the first master device;
subsequently receiving by the first master device the alarm information from the slave device over the PMBus; and
in response to the alarm information acquired from the slave device, generating an interrupt to a process that executes a process of sending the PMBus command to the slave device, such that the PMBus command will not be sent from the first master device to the slave device again.

7. The method according to claim 6, wherein when the number of times that the PMBus command fails to be sent is less than the preset value, and before the starting timing, the method further comprises sending a command of clearing alarm information in the slave device to the slave device to allow the slave device to clear the alarm information stored in a local memory of the slave device and to release the local memory.

8. A system for processing a data conflict, comprising:
a plurality of master devices;
a slave device; and
a power management bus (PMBus) coupled to the master devices and the slave device, wherein the each master device accesses the slave device over the PMBus to perform power management, wherein the PMBus arbitrates amongst the master devices to allow only one of the master devices sending a PMBus command to the slave device at a time,
wherein the each master device comprises an adaptive voltage scaling (AVS) module, wherein the AVS module comprises:
a command sending unit configured to send a PMBus command to the slave device by using the PMBus;
a determining unit configured to detect that the PMBus command has failed to be sent and in response to the detection, including determining that an ownership of the PMBus has been granted by the PMBus to a second master device of the plurality of master devices at a point in time, determine whether a number of times that the PMBus command fails to be sent is greater than or equal to a preset value when the PMBus command fails to be sent, wherein the preset value is configured in advance during system initialization; and
a timing unit configured to start timing when the number of times that the PMBus command fails to be sent is less than the preset value, and wherein the command sending unit is further configured to resend the PMBus command when timing duration of the timing unit reaches resending time, wherein the resending time is specifically associated with the first master device, wherein the resending time is greater than time required for sending a shortest PMBus command by any of the master devices, and wherein the resending time is less than or equal to a sum of time required for sending a longest PMBus command by all of the master devices in a system.

9. The system according to claim 8, wherein the AVS module further comprises a time configuring unit configured to configure the resending time as a fixed duration, wherein each of the plurality of master devices is preconfigured with a fixed duration that is different from a remainder of the master devices, such that a possibility of subsequent data conflict can be reduced.

10. The system according to claim 8, wherein the AVS module further comprises a time configuring unit configured to configure the resending time as a random duration dynamically prior to starting the timing, in response to detecting that the PMBus command has failed.

11. The system according to claim 9, wherein the time configuring unit comprises a first time configuring subunit configured to configure resending time of the master device as the fixed duration before sending the PMBus command to the slave device over the PMBus, wherein the fixed duration configured for a different master device in the system is different.

12. The system according to claim 10, wherein the time configuring unit comprises a second time configuring sub-unit configured to configure, before the starting timing, the random duration for a master device that fails to send the PMBus command when the number of times that the PMBus command fails to be sent is less than the preset value.

13. The system according to claim 8, wherein the AVS module further comprises an alarm reporting unit to instruct the slave device to report alarm information when the number of times that the PMBus command fails to be sent is greater than or equal to the preset value, wherein the slave device is instructed to report the alarm information prior to sending the PMBus command by the first master device, to subsequently receive the alarm information from the slave device over the PMBus, and wherein the master device further comprises a processing module, in response to the alarm information acquired from the slave device, to generate an interrupt to a processor that executes a process of sending the PMBus command to the slave device, such that the PMBus command will not be sent to the slave device again.

14. The system according to claim 8, wherein the command sending unit is further configured to send a command of clearing alarm information in the slave device to the slave device to allow the slave device to clear the alarm information stored in a local memory of the slave device and to release the local memory.

15. The method of claim 1, wherein the PMBus is an inter-integrated circuit (I2C) serial bus.

16. The method of claim 1, wherein the PMBus command is sent from a master device to the slave device over the PMBus, wherein the master device is an application specific integrated circuit (ASIC) or a processor, and wherein the slave device is a power supply chip.

17. The method of claim 1, wherein the slave device comprises a power supply chip that provides power to the first master device, wherein the PMBus command is to instruct the power supply chip to modify a voltage supplied to the first master device.

18. The method of claim 6, wherein the slave device is configured to report the alarm information only when the number of failures exceeds the preset value.

* * * * *